United States Patent
Grynberg (10) Patent No.: US 7,216,227 B2
(45) Date of Patent: May 8, 2007

(54) METHOD AND SYSTEM FOR CONTROLLING THE USE OF ADDRESSES USING ADDRESS COMPUTATION TECHNIQUES

(76) Inventor: Amiram Grynberg, 72 Nashua Rd., Windham, NH (US) 03087

( * ) Notice: Subject to any disclaimer, the term of this patent is extended or adjusted under 35 U.S.C. 154(b) by 734 days.

(21) Appl. No.: 10/389,134

(22) Filed: Mar. 13, 2003

(65) Prior Publication Data

US 2003/0200334 A1    Oct. 23, 2003

Related U.S. Application Data (60) Provisional application No. 60/378,866, filed on May 9, 2002, provisional application No. 60/374,851, filed on Apr. 23, 2002.

(51) Int. Cl.
*G06F 15/16* (2006.01)
*H04K 1/00* (2006.01)
*H04L 9/00* (2006.01)

(52) U.S. Cl. ............... 713/162; 713/154; 709/245; 705/74

(58) Field of Classification Search ............... None
See application file for complete search history.

(56) References Cited

U.S. PATENT DOCUMENTS

| | | | | |
|---|---|---|---|---|
| 6,161,129 A | * | 12/2000 | Rochkind | 709/206 |
| 7,093,288 B1 | * | 8/2006 | Hydrie et al. | 726/13 |
| 2003/0182414 A1 | * | 9/2003 | O'Neill | 709/223 |

* cited by examiner

*Primary Examiner*—Gilberto Barron, Jr.
*Assistant Examiner*—A. Nobahar (57) ABSTRACT

A system and method for controlling the use of addresses by using address computation techniques is described. A system comprising alias address creation software generates multiple alias addresses representing a single real address of a particular recipient. Each alias address is computed from data representing a prospective sender and a recipient. A sender is provided with an alias address by a recipient for communicating back to said recipient. Messages sent by a sender, employing alias addresses are analysed to a forwarding server which validates each alias address and checks it against a blocking list. Messages which pass these checks are directed to the recipient's real address registered with said forwarding server.

1 Claim, 6 Drawing Sheets

Fig. 1

201a: <some-mailbox>@<some-domain>

Example: john@domain.com

201b: <some-mailbox>@<some-server><some-domain>

Example: john@server.domain.com

Alias Address 202: <Encoded String >@<some-domain>

Example: Aqtsi2@somedoain.com

Alias Address 203

203a: <Encoded String >@<virtual server.><some-domain>

Example: Aqtsi2@john.somedomain.com

203b: <Recipient Identifier><Encoded String >@<some-domain>

Example: john.Aqtsi2@somedomain.com

Alias Address 204:

<Sender Identifier>.<Encoded String >@<virtual server.><some-domain>

204a Example: joe.sender.com.Aqtsi2@john.somedomain.com

204b Example: sender.com.Aqtsi2@john.somedomain.com

Postal Address 205: P.O.Box <virtual number>-<encoded number>

Telephone Address 206: <area code><virtual number> ext. <encoded number>

METHOD AND SYSTEM FOR CONTROLLING THE USE OF ADDRESSES USING ADDRESS COMPUTATION TECHNIQUES

CROSS-REFERENCE TO RELATED APPLICATIONS

Provisional applications 60/378,866 filed on May 9, 2002 and 60/374,851 filed on Apr. 23, 2002 replaced by this non provisional application.

BACKGROUND OF THE INVENTION

The present invention relates to data processing systems, and more specifically to a system and a method for controlling the dissemination of contact addresses in order to minimize Spam.

The Internet is growing in popularity, and more and more people ("Senders") are conducting business over the Internet, advertising their products and services by generating and sending electronic mailings. These electronic mail (e-mail) are usually unsolicited and regarded as nuisances by the recipients. Because this type of mail is so undesirable, it has acquired a special name in the Internet community: Spam.

Therefore, it is highly desirable to have a system where recipients of e-mail can exert control over the use of one's e-mail address by second and third parties, so as to minimize the exposure of e-mail address to unwanted Spam.

Of a particular importance is the issue of providing one's e-mail address to Web sites during a sign-up or ordering process. Many times, rogue web owners, abuse the trust of such a user and either sell said e-mail address to third parties or bombard the user with unsolicited e-mails themselves.

It is very desirable therefore, to have a system that would facilitate an easy procedure where one could easily control the use of one's e-mail after such an e-mail address is given out.

There exists an anti-Spam e-mail service (www.spamex.com) which lets a user generate multiple alias e-mail addresses representing one real e-mail box. Said alias e-mails are then provided to would be senders. E-mails sent by said senders to said alias e-mail addresses are received by the service and forwarded to the real e-mail box. A recipient may assign different e-mail addresses to would be senders and thus be able to differentiate among them based on the alias address to which they were sent. Any unwarranted use of the alias e-mail can be blocked as it is associated with a specific sender. However, said service requires that a user explicitly specifies such alias addresses for the forwarding service to recognize them. Otherwise, e-mails directed to alias e-mail addresses which are not defined, are held in storage—wasting dear resources, until said user manually approves or rejects them.

Yet, another system (U.S. Pat. No. 6,266,692) requires that a sender includes a secret passkey as part of the sent e-mail header, for it to be authorized by a receiving program. The problem with this system is that a sender has no standard way for handling these pass-codes in a typical e-mail program like Outlook or others.

Therefore, it is highly desirable to have a system which can always block unwanted mail, without compromising system resources. It is also highly desirable to have a system that requires no modifications to the sender's client e-mail software and that prevents unauthorized transfer of e-mail addresses to third parties.

Moreover, it is clear that the integration of e-mail address creation with automated form filling software, alleviates a problem users encounter today when they need to fill up many sign-up forms on the Web, each requiring said user to provide e-mail address. Similar advantage is recognized when address creation software is integrated with e-mail sending programs.

SUMMARY OF THE INVENTION

The present invention is a method and a system for controlling the use of addresses in order to minimize Spam. In a preferred embodiment of the current invention a client part software executing on a user's computer, creates what looks like a pseudo random addresses ("Alias Address") to be communicated to future senders from whom said user wishes to receive communication. Said Alias Address is created to be specific to the entity for which it was created. Once created, it is made available to users and or software agents for communicating said Alias Address to prospective senders ("Senders"). Said Alias Address can be communicated via a Web form, used as a return address of an outgoing e-mail or any other communication means. A Sender, in possession of said Alias Address can communicate with said user ("Recipient") using said alias address.

A Sender, uses said Alias Address with any e-mail sending software for sending an e-mail message to a Recipient by simply entering the Recipient's Alias Address in the "To:" field of any standard e-mail program. Similarly, a Sender can use it as a postal address or a telephone number to call.

A standard e-mail sending software, which could be an Simple Mail Transfer Protocol (SMTP) server, then queries a Domain Name Server (DNS) which is part of a preferred embodiment of the current invention, resolving the Recipient's Alias Address to an Internet Protocol (IP) address of an e-mail Forwarding Server which is yet another part of the present invention. Said e-mail sending software then sends said e-mail message to said e-mail Forwarding Server.

Said e-mail Forwarding Server validates that address by performing computations on said Alias Address and then determines the real e-mail address of a Recipient by performing computation on said Alias Address.

After successful validation, the e-mail message is forwarded to the real e-mail address of the Recipient. Invalid alias addresses may be rejected.

According to a preferred embodiment of the present invention, each Sender is allocated a different and recognizable Alias Address, thus facilitating a filtering mechanism where e-mails directed to a particular Alias Address can be blocked by specifying to the Forwarding Server which Alias Address should not be forwarded. In another embodiment of the invention, an Alias Address is validated only if the specific Sender to which it was communicated initially is the actual sender of said e-mail. Thus, allowing the e-mail Forwarding Server to reject e-mails sent to a Recipient from third parties who received an unauthorized copy of an Alias Address from a Sender. This embodiment resolves the issue of unauthorized sale or transfer of one's e-mail address by senders to third parties.

With such a mechanism, a Recipient's real e-mail address is kept secret and Senders are only provided with an Alias Addresses.

Although solving the problem of e-mail based spam is the focus of this description, it is clear to those skilled in the art that similar methods and systems can be used for postal addresses and telephone numbers.

DETAILS OF THE INVENTION

Protecting a recipient's e-mail address from abuse is best achieved by keeping that e-mail address private. Once an e-mail address becomes public, the owner of that e-mail has little control of the use or dissemination of said e-mail address. However, it is clear that keeping an e-mail address secret, defeats the purpose of having an address. A more practical solution is to have multiple addresses ("Alias Address(es)") which represent a single mailbox. With such an approach, a mailbox owner (a "Recipient") can selectively provide a different e-mail address to each and every "would be" sender (a "Sender"). Alternatively, Senders may be grouped and a different e-mail address is provided to each group.

Because each Alias Address is now associated with a known Sender, a Recipient can easily block e-mails from Senders, who abuse the use of said Alias Address, by creating a filter that rejects e-mails directed to Alias Addresses associated with said Senders.

A Recipient provides Alias Addresses to senders in a variety of ways. A Recipient may create an Alias Address off-line and manually provide it to a Sender through the telephone, included in an e-mail or any other communication means. However, it is very desirable to facilitate the automatic creation of Alias Addresses as an integrated part of other processes. Furthermore, it is desirable that any outbound e-mail a Recipient sends, is transformed to replace any reference to the Recipient's real e-mail address with the appropriate Alias Address—so as to keep the real address secret and provide for address shielding.

One of the features of the current invention is the process whereby an Alias Address is generated automatically by a client software as part of an on-line form filling process thus facilitating an automated sign-up process. Another feature of the current invention is the integration of return address shielding with standard e-mail clients so as to automatically provide such service.

The current invention describes a system and a method for creating of Alias Addresses and a mechanism that implements the assignment, filtering, forwarding and shielding of e-mail addresses. The system is comprised of several software parts, running on one or more processing units and implementing the methods described hereinafter as a preferred embodiment of the current invention. It is clear to those skilled in the art of data processing that other configurations are possible as well.

Figure 1:
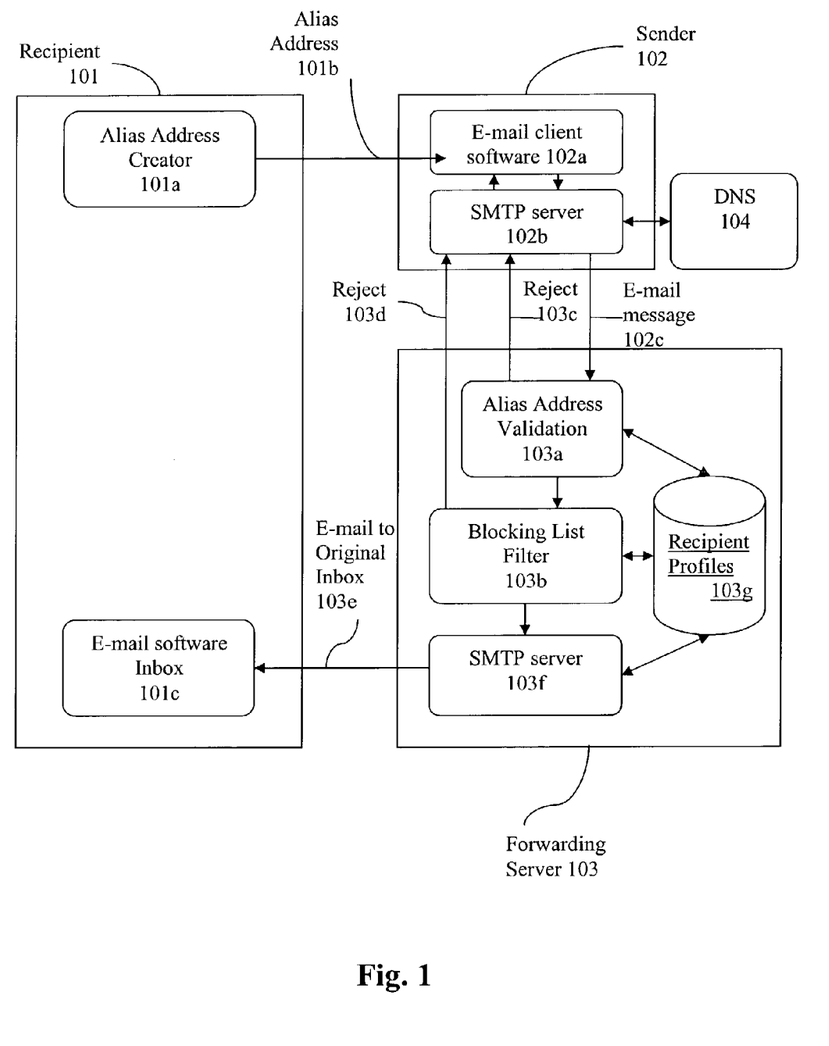
FIG. 1 is a system block diagram.

FIG. 1 is a generic block diagram 100 of a preferred embodiment of the current invention that depicts the relationship among the various parts comprising a system.

A Recipient user 101 with Alias Address Creator software installed 101a on a desktop computer, triggers the creation of an Alias Address. An Alias Address 101b is created by Alias Address Creator 101a and communicated by Recipient 101 to a would be Sender 102 of future e-mails to said Recipient. Such communication is carried out through a Web page, an E-mail or other means.

Sender 102, wishing to contact Recipient 101 prepares an e-mail message 102c addressed with Alias Address 101b. An e-mail message 102c is sent by a standard e-mail client program 102a like Microsoft Outlook to an e-mail distribution server 102b which could be a standard SMTP compliant server.

Server 102b needs to resolve the Internet address represented by Alias Address 101b into an IP address. A standard way of resolving e-mail addresses is via a standard DNS server 104. DNS server 104 translates the Alias Address into an IP address of the e-mail Forwarding Server 103.

E-mail message 102c is received by a Forwarding Server 103 which invokes a Validation program 103a to check the authenticity of Alias Address 101b carried in the header of said message 102c.

If Validation fails, a Reject message 103c is sent back to Sender 102. Otherwise, e-mail message 102c is forwarded to a Blocking list filter 103b which looks up the Alias Address 101b in a blocking list database. If found, a Reject 103d message is sent back to Sender 102. Otherwise, e-mail message 105b is modified 103e so that it is addressed now to its final destination by retrieving Recipient's true e-mail address from database 103g. E-mail message 103e is now sent to its final destination using standard e-mail sending software SMTP server 103f.

Alias Address Creator 101a is a software part that is typically installed on a Recipient's client machine (e.g desktop computer). But, it can also run on a different machine or a server. It creates Alias Addresses for a Recipient. An Alias Address is an e-mail address which is fully compliant with international standards. However, it contains some parts which make it very difficult for third parties to fake such an address. Said address contains at least one part string (the Encoded String) which is created through calculations to produce a string that is depended on data parts related to a particular Recipient and/or a Sender.

Figure 2:
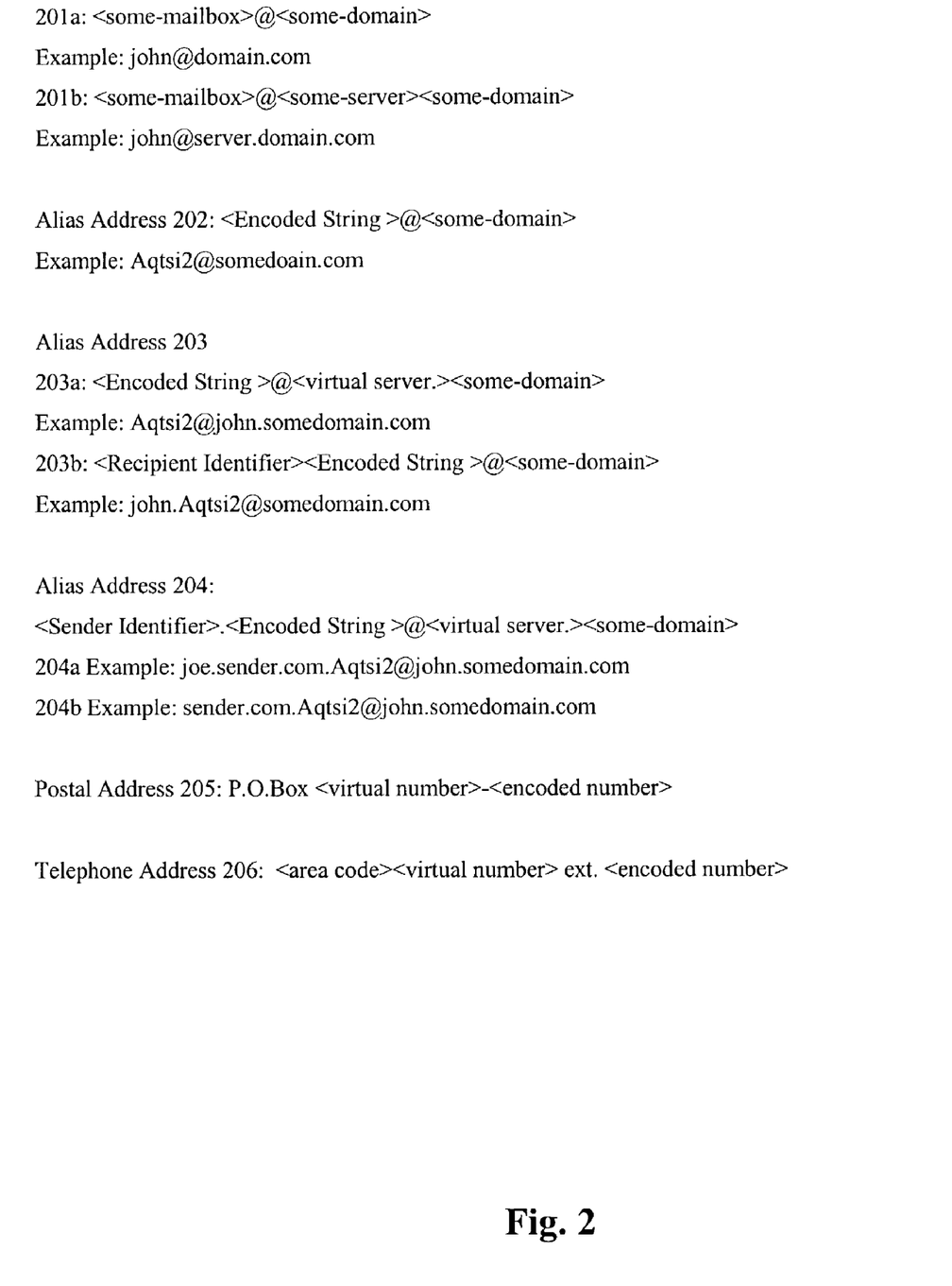
FIG. 2 diagrams various e-mail address formats

FIG. 2 is a structure diagram of various e-mail addresses.

201a and 201b are templates and examples of generic e-mail addresses, where the "<some-mailbox>" part represents a string identifying a mailbox. In systems not implementing the current invention said mailbox name is the real mailbox for a particular Recipient, "<some-computer.>" is one or more of optional computer names or virtual computer names separated by a "dot" and "<some-domain>" is an existing Internet domain name.

202 is a simple case of an Alias Address. The <Encoded String > part is an encrypted string. The clear text that was encrypted represents a specific Recipient's mail box. The clear text string could be a unique name (or ID) for each Recipient, concatenated with additional information such as a random number, time of day or an identifier related to a Sender entity. With this structure, multiple alias addresses can be created for a single user. A common encryption key is required for this structure, therefore a public key is better suited for creating the <Encoded String>. Still, it is easy for a third party to create such Encoded Strings without authorization due to he fact that a common key is employed.

203 resolves the security issue of 202 by adding a Recipient identifier to the e-mail structure. In 203a a virtual server part is added where the server name identifies a specific Recipient. In 203b, a Recipient identifier is concatenated to the <Encoded String> and no virtual server is used. It is clear that many such permutations could exist. With this structure, each Recipient uses a unique key to generate the <Encoded String>.

204 which is a preferred embodiment of the current invention, adds yet another part to the structure of Alias Address. By concatenating a <Sender Identifier> with the <Encoded String>, each Alias Address is now easily recognizable as being related to a particular Sender. In 204*a*, the Sender's e-mail address is used as identifier. The original e-mail address of "joe@sender.com" is transformed into "joe.sender.com". In 204*b* the Sender's Web site "www.sender.com" is transformed into "sender.com".

In both 203 and 204, the <Encoded String> part is a digital signature string which ascertains the validity of the whole Alias Address.

In 205 a template for a postal address is offered which can be manipulated by the same methods offered in this invention. The <virtual number> replaces the <virtual server> part of an e-mail address and <encoded number> replaces the <Encoded String> of an e-mail address.

In 206 a template for a telephone number is offered which can be manipulated by the same methods offered in this invention. The <virtual number> replaces the <virtual server> part of an e-mail address and <encoded number> (extension) replaces the <Encoded String> of an e-mail address.

The mathematical function used to compute the Encoded String (a "Forward Function") is secret and not available to other parties. Alternatively, the Forward Function is not secret but uses at least a secret key or data to generate the computed Encoded String and is implemented by standard encryption or hashing techniques.

A Forward Function must have an associated Reverse Function, which may be identical to the Forward Function. Said Reverse Function should be able, as a minimum, to check the validity of the Encoded String. Alternatively, said Reverse Function should be able to decode the Encoded String to reveal the identity of a Recipient.

There are numerous functions that satisfy these criteria and they are well known to those skilled in the art of encryption techniques. Various algorithms are discussed in B. Schneier, "Applied Cryptography" John Wiley & Sons $2^{nd}$ ed. 1996. For illustrative purposes, a Forward Function could be a Hashing function that creates a digital signature string. Alternatively, a Forward Function may be a symmetric encryption function like DES, but a more appropriate function would be a stream cipher like RC4, or it can be an asymmetric function like a Public Key Encryption.

In the preferred embodiment of this invention, address template of 204 is assumed.

In this case a hashing function is useful as a non-random Alias Address based on a Sender-Recipient pair is required. In such a case the <Sender Identifier> string is hashed using a secret key associated with <virtual server> to produce the <Encoded String> part.

An encryption function is useful when encrypting a Recipient's ID using a secret key. To facilitate a pseudo random string creation for each new Alias Address, the Recipient's ID may be concatenated with a numerator or a date-time string. It is helpful also to add a checksum string to those two strings (e.g. <recipient id>-<numerator>-<checksum>). The resulting string is then encrypted to produce an Encoded String. In a Reverse Function, the Encoded String is decrypted to reveal the original sub-strings which can then be validated by re-evaluating the checksum of the first two sub-strings and comparing it to the third sub-string.

An string, resulting from the above processing may not be suitable for inclusion in the Alias Address directly since each class of addresses has a well defined permitted alphabet. Therefore, another step is required to encode the resulting digital signature or encrypted string to the permitted alphabet. Such encoding methods are well known to those skilled in the art. A well documented method for alphanumeric characters is the BASE64 encoding used by international standards. Similar techniques can be used for numeric only strings.

Figure 3:
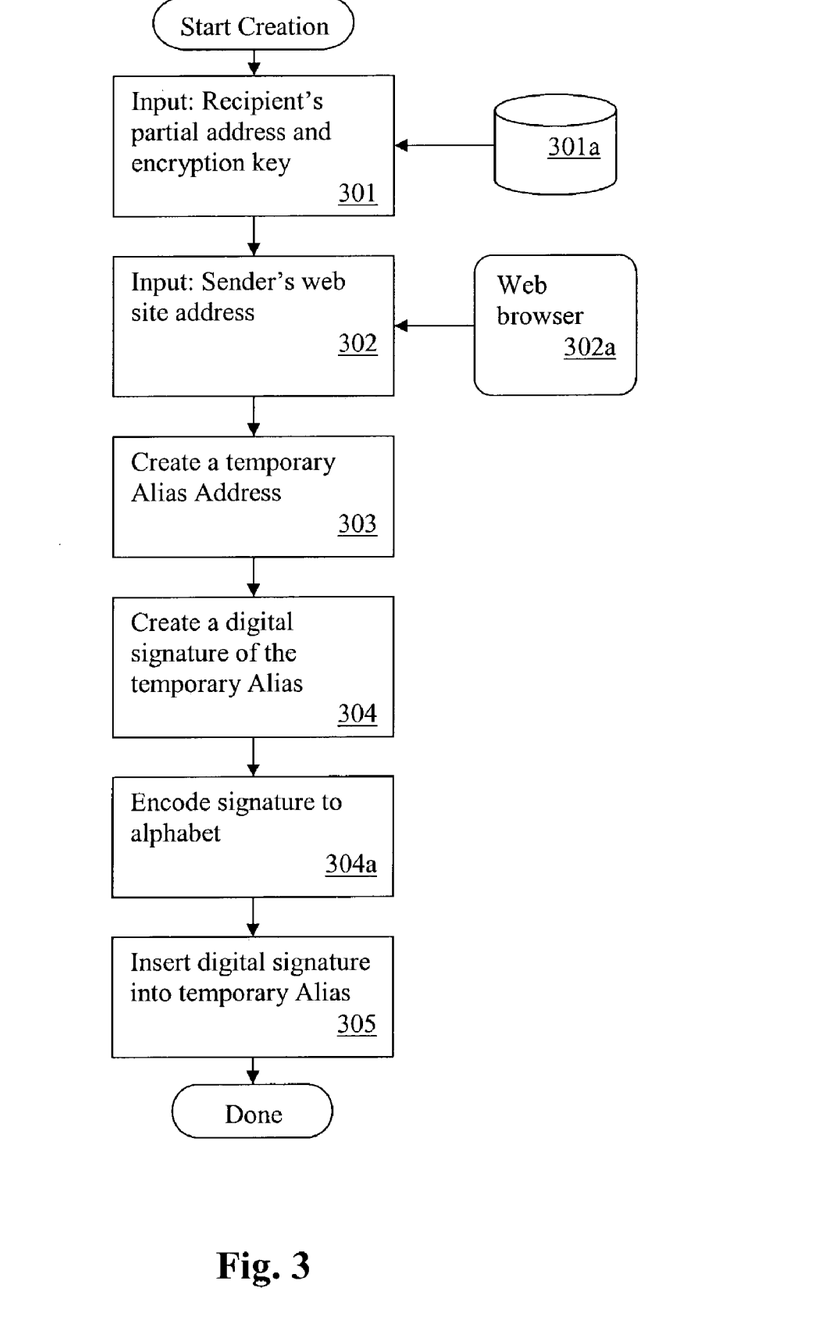
FIG. 3 is a flowchart of address creations

FIG. 3 is a flow chart of a process for creating an Alias Address. This process is implemented in software. In 301 a Recipient's partial address is retrieved from storage 301*a*, including <some-domain> and <virtual server>. In example 204*b* that would be the string "john.somedomain.com" an encryption key associated with Recipient is also retrieved. In 302, a second parameter is added. This parameter, a URL of a Web site of a Sender for whom this Alias Address is created, can be retrieved from a Web browser 302*a* executing on the same computer. In example 204*b* that would be the string "sender.com". It could also be the e-mail address of said Sender or any other identifier of said sender.

In 303, a temporary Alias Address is created by concatenating the various parts. In example 204*b* that would result in the string "sender.com@john.somedomain.com". The "somedomain.com" part identifies the Internet domain where a Forwarding Server is to be found.

A digital signature is created in 304 according to one of the many methods described above. Hashing the temporary address, using the encryption key, or encrypting the temporary address directly. The resulting digital signature is a string of characters which is then encoded in 304*a* to conform to the required alphabet and then inserted into the temporary Alias Address in 305, to produce a final Alias Address as per example 204*b*.

Domain Name Server (DNS) 104 is a standard part comprising a typical system. This software typically looks up the <some-domain> part of an e-mail address to find out the IP address of the computer running the e-mail Forwarding Server. However, in a preferred embodiment of the current invention, it is desirable to have an address of the form <some-mailbox>@<some-computer>.<some-domain> where the <some-computer> part in reality a virtual non-existent computer that serves as an identifier of a Recipient. To handle such virtual computer names, a standard DNS has to be modified to respond to virtual computer names. This technique is well known to those skilled in the art and is found in many DNS services provided by Internet Service Providers. E.g. www.mv.com.

E-mail Forwarding Server 103 is an essential part comprising a typical system. Said software may use an SMTP protocol to receive e-mail message 102*c* from SMTP server 102*b* and forward it to its final destination at 101*b*. Upon receipt of an e-mail (or an e-mail header), e-mail Forwarding Server, invokes Alias Address Validation 103*a* to verify the authenticity of Alias Address 101*b*.

Figure 4:
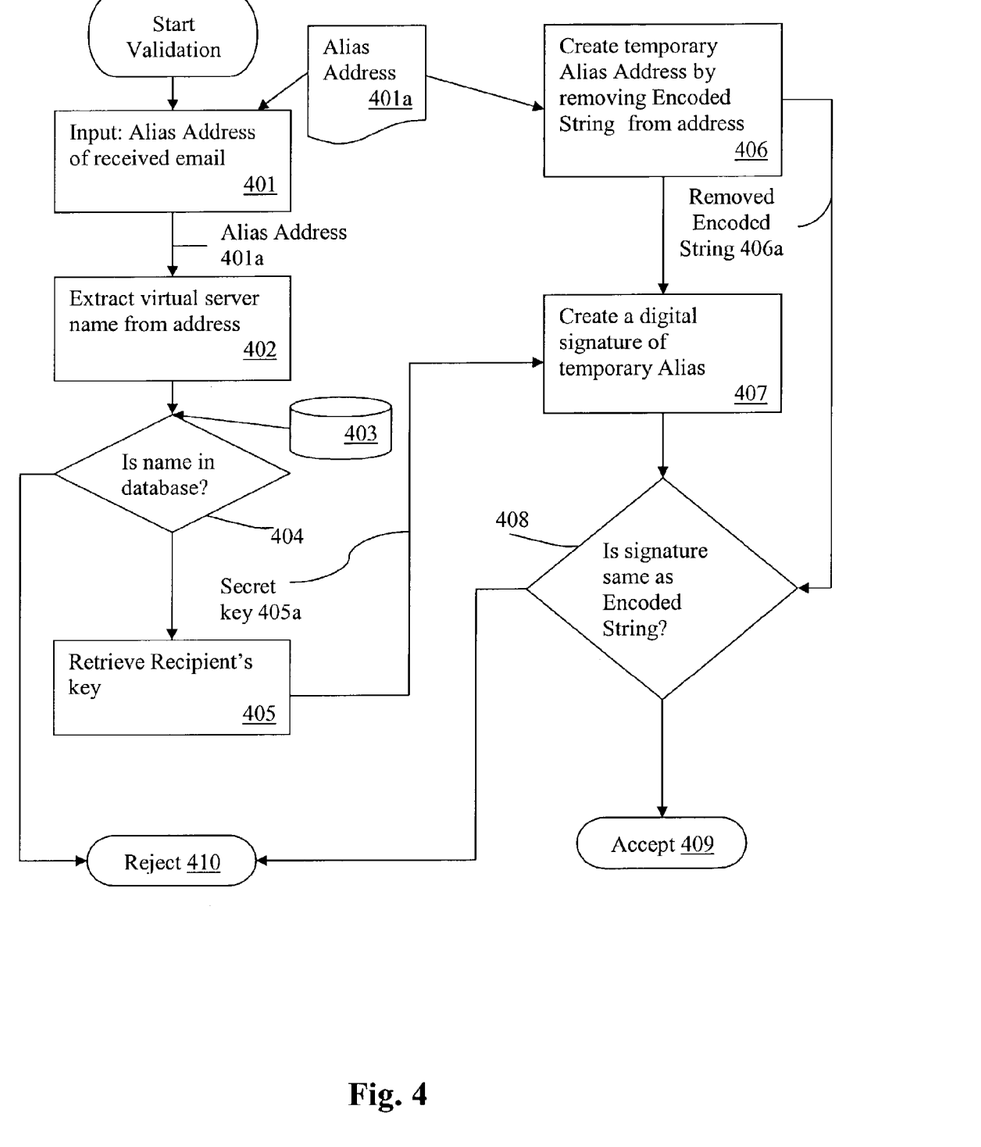
FIG. 4 is a flowchart of address validation

FIG. 4 is a flowchart of a Validation software which performs the validation process. It employs a Reverse Function to validate and if required to decode the Encoded String part of Alias Address.

In 401 an Alias Address 401*a* is extracted from E-mail message 201*c*. Alias Address 401*a* is analyzed in 402 and the virtual server part (e.g. "john") is extracted. In 404 the virtual server name is looked up in database 403. If not found, the e-mail is rejected in a standard fashion as defined in the SMTP protocol. If found, 405 retrieves a secret encryption key 405*a* associated with that virtual server. In 406, A temporary Alias Address is created from Alias Address 401*a* by removing the Encoded String part. This can be readily carried in various ways, but in the preferred embodiment, it relies on a "dot" character separator between the Encoded String and the Sender Identifier parts. Such a "dot" character is not part of the alphabet allowed for the Encoded String. In example 204*b*, the resulting temporary Alias Address would be "sender.com@john.somedomain.com". In 407, a digital signature of the temporary Alias Address is computed using the same function that was used by Alias Address Creator 101*a* in steps 304 and 304*a*. The resulting string is compared in 408 with the removed Encoded String 406*a*. If they prove to be the same, Alias Address 401*a* is validated in 409, otherwise it is rejected in 410. Once an Alias Address is validated as being authentic, it is forwarded to a Blocking List Filter part 103*b*.

The above process can be further enhanced to address the issue of automatically detecting a case where a Sender gave the Alias Address to a third party not authorized to use it. The enhanced process is possible if in step 302, the Sender's e-mail address is used in lieu of a Web address. In that case example 204*a* illustrates an Alias Address and "joe.sender.com@john.somedomain.com" is the temporary Alias Address. Step 408 is further refined to include comparing the "joe.sender.com" part with the "from:" part of the e-mail header being processed after the '@' character has been converted to '.'.

Figure 5:
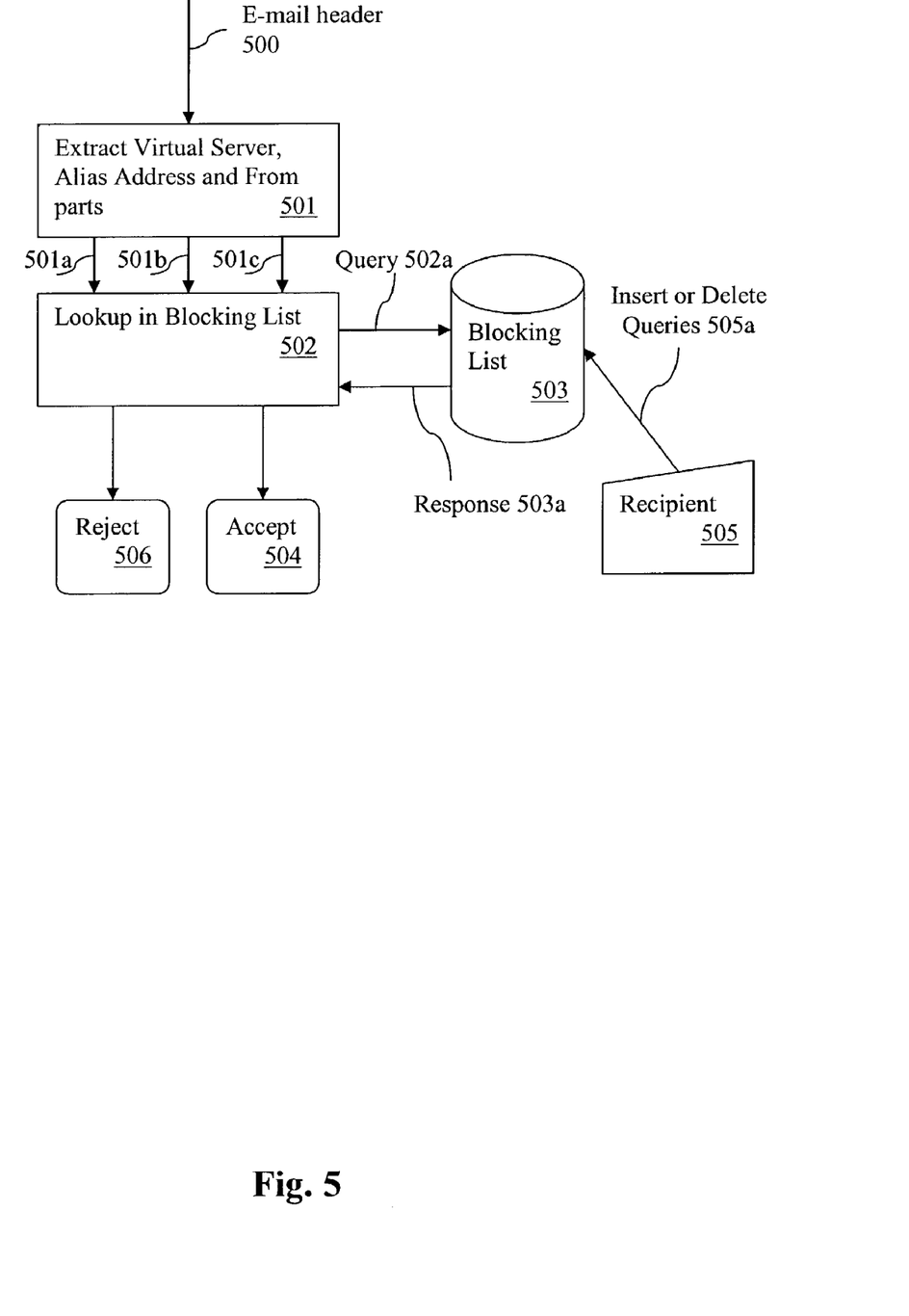
FIG. 5 is a diagram of blocking list filter

FIG. 5 is a more detailed diagram of the Blocking List Filter. A Recipient 505 sends an Insert SQL query 505*a* to database 503 via a Web browser, dedicated link or any other standard but secured communication means. Said query inserts as a minimum an Alias Address and a Virtual Server name assigned to Recipient 505. Recipient 505 can also send a Delete query to invoke removal of any Alias Address previously entered by said Recipient. It is clear to those skilled in the art of databases that more qualifiers can be entered to further define an Alias List to be blocked. An example of a qualifier would be a string of characters which should be looked up in the e-mail address of the sender of e-mail 102*b*. Such a string could be specified as an exclude/include condition.

A standard e-mail header 500 of message 102*b*, is submitted to analyzer 501 which extracts data items from said header. As a minimum, in the preferred embodiment, such items include a Virtual Server part 501*a* and an Alias Address part 501*b*. Yet, in another embodiment, it could also extract other items 501*c* like an e-mail address specified in the "From:" field of said e-mail header 500. Said extracted data items are transferred to a Lookup software 502 which sends an SQL query 502*a* to database 503. As a minimum, said query searches for a record containing Alias Address 501*b* and Virtual Server 501*a*. However, it could also check for qualifiers entered by Recipient 505 being sub-strings of the From field 501*c*. Other queries are possible and are clear to those skilled in the art of database queries.

Database 503 responds with a list of records 503*a* satisfying said query 502*a*. If no record is found, an Accept response is returned from the Blocking List Filter. Otherwise a Reject response is returned.

If an e-mail is accepted by Blocking List Filter 103*b* it is transferred to SMTP server 103*f* for final dispatch to the original Recipient. To facilitate such delivery, SMTP server 103*f* looks up the real e-mail address of Recipient 101 in database 103*g* using the virtual server name embedded in Alias Address 101*b*. The process for extracting a virtual server name from Alias Address is similar to the one carried out by Blocking List Filter 103*b* in step 501. Once a real address is available, the Alias Address in the e-mail header is replaced with the real address and a standard delivery process is executed.

Figure 6:
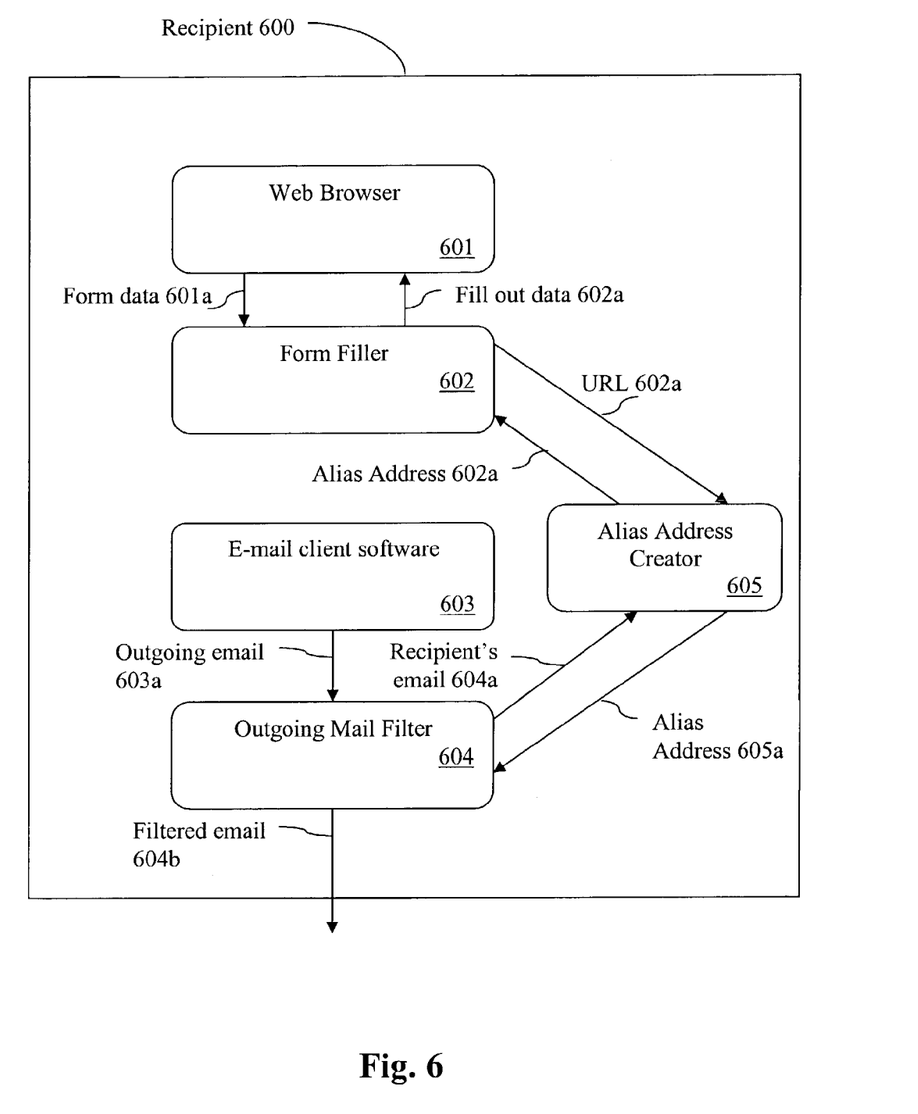
FIG. 6 is a diagram of form filler and mail client integration

FIG. 6 is a block diagram of a preferred embodiment of the current invention with Form Filler and e-mail client integration software added. Recipient's desktop computer 600 has Web browser 601, Form Filler 602, E-mail client 603 and Outgoing Mail Filter 604 software components interacting with Alias Address Creator 605. Web browser 601 is a standard Web browser like Microsoft Internet Explorer, which provides for software hooks or extensions, so that third parties can integrate with said browser to facilitate retrieval from and setting of data to said browser in a programmatic way.

Form Filler 602 is a software module which integrates with Web browser 601 via said hooks and extensions. When Form Filler 602 detects a form loaded into Web browser 601, it extracts the URL of said form and sends it to Alias Address Creator 605. Alias Address Creator, using a process described in FIG. 3, creates an Alias E-mail address 602*a* which is then returned to Form Filler 602. There are multiple ways for Form Filler 602 to handle said Alias Address 602*a*. It can display it to a user who would then enter said Alias Address to a Web form, or it could use an automatic form filling software to detect the correct field in the form where an e-mail address is requested and set Alias Address 602*a* in said field. Form filling technology which is capable of detecting form fields and programmatically filling in electronic forms is well known and is available commercially from various vendors. For example, www.roboform.com offers such a product.

In 603, a standard e-mail client software, like Microsoft Outlook, is used by Recipient to create and send email messages. Outgoing e-mails 603*a* are intercepted by Outgoing Mail Filter 604. There are various ways to effect such intercept. One common way is to structure 604 as an SMTP server and changing outgoing mail server settings in e-mail client software 603 so that all outgoing e-mails will be sent via Outgoing Mail Filter 604. Yet a preferred embodiment of the current invention uses a redirection software capturing all IP traffic directed at port 25 (or any other port designated for SMTP protocol). Such redirection software is readily available from various vendors including Microsoft.

When an e-mail message 603*a* is created by 603 it has the real e-mail address of Recipient embedded in said e-mail at least as its return address or the "From:" field. The purpose of having Outgoing Mail Filter 604 is to modify outgoing e-mail messages 603*a* so that any reference to the original e-mail address of said Recipient is substituted with an Alias Address. In a preferred embodiment of the current invention, said Alias Address would be created in such a way so that it will identify the recipient of e-mail 603*a*. Said recipient is not the Recipient but the Sender as defined in FIG. 1. Outgoing Mail Filter 604 extracts the mailing address of e-mail 603*a* from its header and submits it in 604*a* to Alias Address Creator, in lieu of Web address as described in the process of FIG. 3.

The returned Alias Address 605*a* is substituted for the original e-mail address 604*a*. The resulting e-mail 604*b* is then sent out to its original recipient.

When Sender 102 receives e-mail 604*b*, it would have as a reply address the Alias address 605*a* thus Recipient's original e-mail address is protected.

Similar methods and systems can be applied to other type of addresses, in particular postal addresses and telephone numbers.

In the first case, a post office box number part of an address can be used to create multiple alias addresses and a forwarding server, at the postal office, managed by a Recipient could be used to direct envelopes carrying those addresses to a real address. 205 presents a sample template for this purpose.

In the second case, multiple virtual extension numbers could be created and managed by a Recipient on the phone company's computer and incoming calls directed at those numbers will be forwarded to a real number. 206 presents a sample template for this purpose.

I claim:

1. A computer-implemented method for automatic submission of an alias address via a web form comprising the steps of:

detecting, on a recipient computer, the web form requesting input of an address;

generating an alias address, by a software on the recipient's computer, based on at least the domain part of the URL of said web form, an encoded string and a recipient's identifier;

detecting and recognizing, in the web form, an input field where said address is to be entered; and filling out said input field with said generated alias address.

* * * * *